Patented Aug. 28, 1945

2,383,610

UNITED STATES PATENT OFFICE 2,383,610

HAND CLEANING COMPOSITION

John D. Morgan, South Orange, and Russell E. Lowe, East Orange, N. J., assignors to Cities Service Oil Company, New York, N. Y., a corporation of Pennsylvania No Drawing. Application March 10, 1943, Serial No. 478,636

3 Claims. (Cl. 252—109)

This invention relates to hand cleaners. More particularly the invention relates to cleaning solutions which can be used for cleaning the hands with or without the use of water.

There are many locations and circumstances where it is not convenient or possible for a person to use water for washing his hands. It is desirable therefore to have a cleaning solution which may be effectively used for practically all cleaning purposes. War maneuvers present many circumstances where a waterless cleaning solution is useful. It is important that such a solution shall maintain antiseptic and germicidal conditions. It is also necessary that the cleaning solution shall effectively clean and remove all types of dirt, dust, grease and the like.

The primary object of the present invention is to provide a solution for cleaning the human body of practically any type of dirt with or without the use of water.

Another object of the invention is to provide a waterless cleaning solution which is antiseptic and germicidal.

A further object of the invention is to provide a method of making a waterless cleaning solution which is stable and effective under most any climatic conditions.

With these and other objects in view, the invention consists in the cleaning solution and the method of making the same hereinafter described and particularly defined in the claims.

The preferred cleaning solution has the following composition:

| | Percent by weight |
|---|---|
| Polyvinyl alcohol | 4.2 |
| Glucarine B | 3.1 |
| Tetrasodium pyrophosphate | 0.01 |
| Trisodium phosphate | 0.05 |
| Nacconol NR | 0.12 |
| Lysol | 0.91 |
| Water | 91.6 |

As an example 50 grams of polyvinyl alcohol is dissolved in 1000 ccs. of distilled water, the alcohol being added in small portions in the cold with constant stirring until all of the alcohol has been dispersed in the water. The solution is then heated to 180° to 200° F. to effectively dissolve the alcohol in the water. To this alcohol solution is then added 30 ccs. of Glucarine B, the Glucarine B going into solution in the heated alcohol solution.

A separate solution of 0.1 gram of tetrasodium pyrophosphate and 0.6 gram of trisodium phosphate and 1.3 grams of Nacconol NR dissolved in 100 ccs. of distilled water is made up, the water being heated and the mixture thoroughly stirred to have the phosphates and sulfonates thoroughly dissolved. The alcohol solution is then mixed with the phosphate-Nacconol solution with constant stirring and 10 ccs. of Lysol are then added to the liquid mixture. The finished mixture is an opalescent, clear solution wherein the ingredients will stay in permanent solution under all ordinary atmospheric temperatures. It has been found that the method of compounding this material, as outlined above, is important because, otherwise, the phosphates, sulfonates, and soaps precipitate and the product is not effective as a cleaning material.

Experiments have been carried on to show that the polyvinyl alcohol in the example given above, may be varied from 75 to 25 grams when making substantially the same amount of solution. Also the Glucarine B may be varied from 40 to 25 ccs., the terasodium pyrophosphate may be varied from 1 gram to 0.05 gram, the trisodium phosphate may be varied from 1.5 to 0.3 gram, the Nacconol NR may be varied from 2.5 to 1.0 gram, and the Lysol may be varied from 12 to 8 ccs.

The polyvinyl alcohol, above referred to, has the formula $(CH_2-CHOH)_x$. This alcohol has a density of 1.3. The polyvinyl alcohol is made by the condensation of the acetic ester of vinyl alcohol while being refluxed in a benzene solution in the presence of an acetyl peroxide catalyst.

Glucarine B is mannitol glycerol mono-oleate, consisting of the reaction mixture of the treatment of a glyceride of oleic acid with mannitol.

Nacconol NR is an alkyl derivative of an aromatic sulfonate. This aromatic sulfonate product is defined as a monoalkylate derivative of an aromatic monosulfate. The product and the method of manufacture thereof is described in the patent to Flett No. 2,283,199 granted May 19, 1942.

The cleaning solution having the composition above referred to and made in accordance with the preferred method of manufacture may be used by placing a small amount of the material on the hands and then by rubbing and kneading the hands so that the solution coats all parts of the hands. Evaporation of the water and alcohol takes place whereby the soaps and detergent materials, such as the phosphates and Nacconol NR, solidify and form a spongy porous mass which absorbs the dirt, grease, or other foreign material which makes the hands dirty, and after the material has been rubbed dry and removed from the hands the dirt is carried away with the crumbly solids precipitated. The Nacconol NR, the tetrasodium pyrophosphate, and the trisodium phosphate are very effective detergents and assist in dissolving and loosening the grease and dirt on the hands. The Nacconol NR is a wetting agent and an emulsion stabilizer which assists in holding the sulfonates and phosphates in water solution. Nacconol NR is equally effective as a detergent in hardwater, soft water or salty water. The Glucarine B has somewhat the physical properties and characteristics of glycerin and tends to make the precipitated detergents soft and crumbly and assists in loosening and absorbing any dirt on the hands.

Lysol is a well known cresylic acid germicide. It has the following composition:

| | Percent by weight |
|---|---|
| Cresylic acid | 50.5 |
| Coconut oil | 30.0 |
| Potassium hydroxide | 8.0 |
| Glycerin | 3.4 |
| Water | 8.1 |

This material is a mixture of commercial cresylic acid and a potassium coconut oil soap. Lysol tends to form an emulsion with water, but effectively goes into colloidal solution in the waterless hand cleaner of the present invention.

The preferred form of the invention having been thus described, what is claimed as new is:

1. A hand cleaning solution comprising the following ingredients proportioned by weight: polyvinyl alcohol 4.2%, mannitol glycerol mono-oleate 3.1%, tetrasodium pyrophosphate 0.01%; trisodium phosphate 0.05%, a mono alkyl derivative of a phenol mono sulfonate 0.12%, cresylic acid potassium coconut oil soap mixture, 0.91%, and water 91.6%.

2. A hand cleaning solution comprising the following ingredients proportioned as indicated: polyvinyl alcohol, 25–75 grams; mannitol glycerol mono-oleate, 25–40 c. c., tetrasodium pyrophosphate .05–1.0 gram; trisodium phosphate, 0.3–1.5 grams; monoalkyl derivative of a phenol monosulfonate 1.0–2.5 grams; a mixture of approximately 50 per cent commercial cresylic acid with a potassium coconut oil soap, 8–12 c. c.; said ingredients being in colloidal solution in about 1100 c. c. of water.

3. A method of making a hand cleaning solution comprising dissolving about 4.2 per cent by weight of polyvinyl alcohol in water, adding about 3.1 per cent by weight of mannitol glycerol mono-oleate to the alcohol solution to make a first solution; separately dissolving about 0.01 per cent by weight of tetrasodium pyrophosphate, about 0.05 per cent by weight of trisodium phosphate, and about 0.12 per cent by weight of a monoalkyl derivative of a phenol monosulfonate in water to make a second solution; the amount of water added to the first and second solutions constituting approximately 91.6 per cent by weight of the finished product; mixing the two solutions; and adding about 0.91 per cent by weight of cresylic acid-potassium coconut oil soap mixture to the mixture of the first and second solutions to complete the finished product.

JOHN D. MORGAN.
RUSSELL E. LOWE.